Sept. 22, 1953    D. M. VAN PELT ET AL    2,653,052
DUMP HOIST
Filed June 30, 1950    2 Sheets-Sheet 1
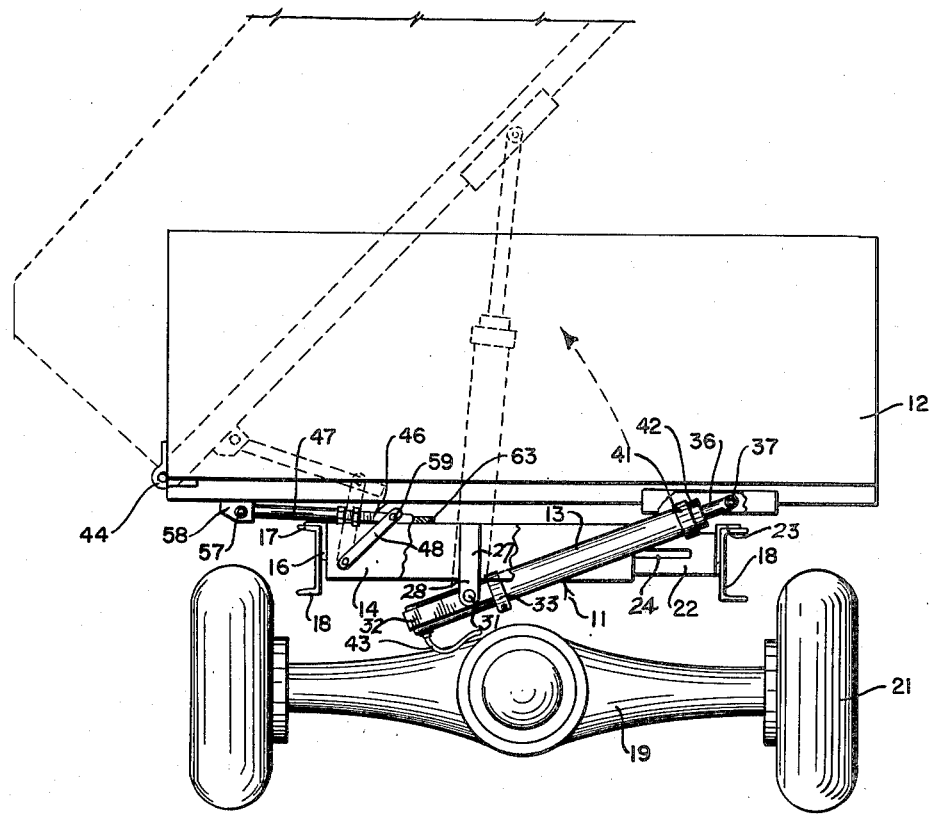
FIG.—1
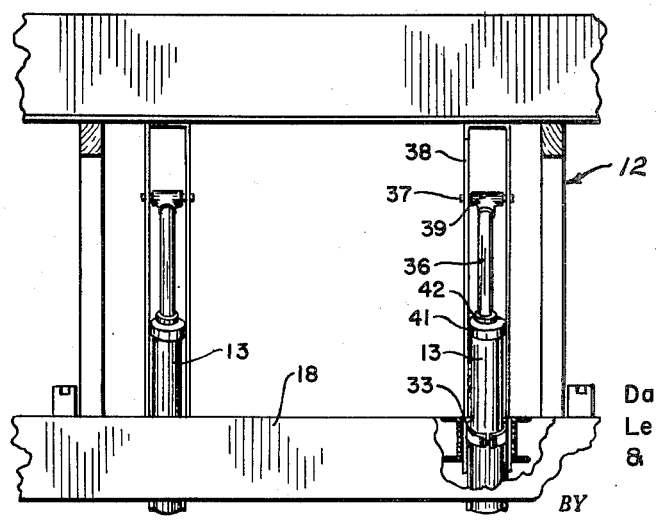
FIG.—2
INVENTORS
Dale M. Van Pelt
Leighton W. Sanner
& Julian Wilson
BY
ATTORNEY

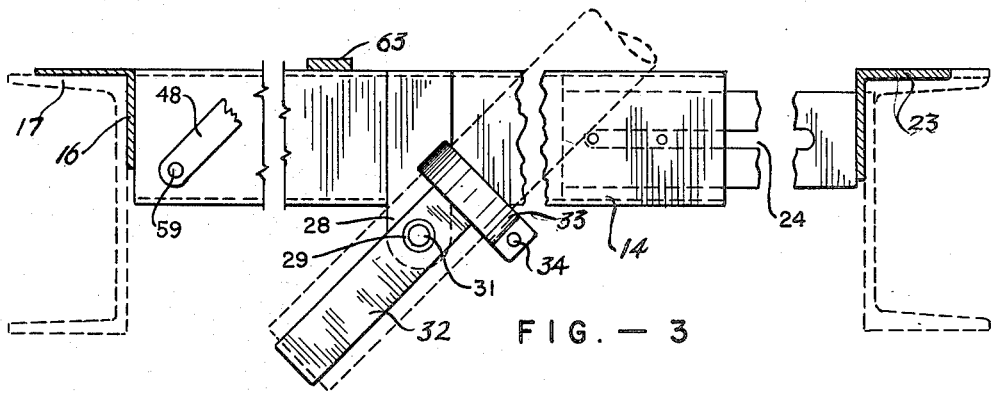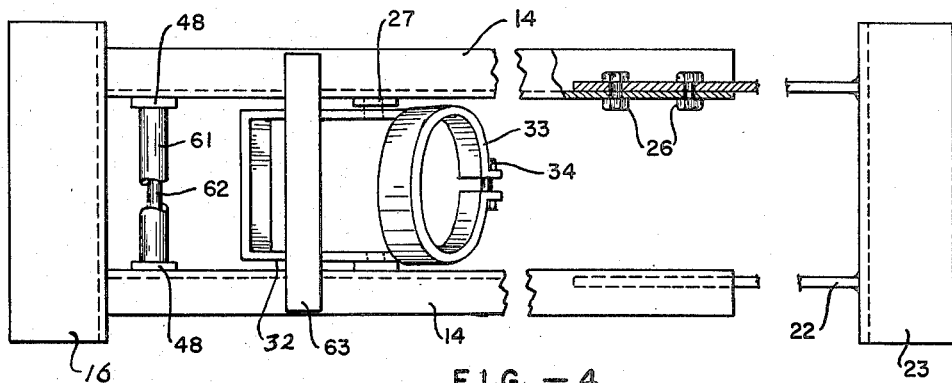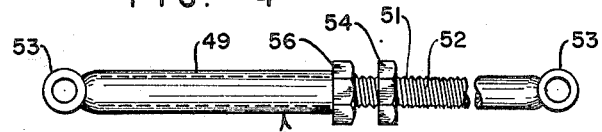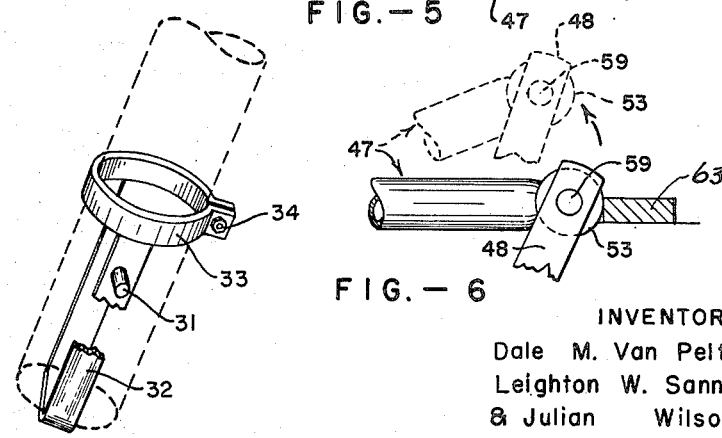
INVENTORS
Dale M. Van Pelt
Leighton W. Sanner
& Julian Wilson
BY
ATTORNEY Patented Sept. 22, 1953

2,653,052

UNITED STATES PATENT OFFICE 2,653,052

DUMP HOIST

Dale M. Van Pelt and Leighton W. Sanner, Loveland, and Julian Wilson, Ault, Colo., assignors to Northern Weld Mfg. Co., a partnership Application June 30, 1950, Serial No. 171,426

3 Claims. (Cl. 298—18)

This invention relates to a dump hoist for truck bodies and the like and more particularly to a hoist, the main parts of which are adjustable so that the hoist may be readily installed on truck beds of different sizes.

For the efficient handling of farm and similar products it has been found advisable to use hoisting mechanisms which are capable of raising a truck bed or other material supporting body so that the products contained within the body may be readily dumped into loading chutes, conveyor systems or other material handling equipment. Previously many different types of hoisting mechanisms have been utilized and in general they have proved quite satisfactory. However in recent years the size of truck beds has been materially increased and it is now found that the bed hoisting equipment provided by grain elevators and the like is either inadequate to handle the increased loads or it is at least inconvenient to use the dumping facilities previously provided. Further since it is often necessary to dump materials at points where separate handling equipment is not provided, it is highly desirable that the hoisting equipment be mounted directly on the truck for use by the truck operator whenever such use becomes necessary.

It is recognized that separate hoist installations can be made up for each different size of truck frame and truck bed. However to fully realize the advantages inherent in large scale production it has been deemed necessary to design and build a dump hoist and support members therefor that may be readily adapted for use on different sizes of trucks, wagons and the like.

The present inventors have devised a dump hoist which may be used on trucks and the like and that may be readily installed for such use without necessitating the manufacture of special frame supports and adapters for each different size of truck bed or truck frame. Further it has been an objective of the present inventors to provide a dump hoist of sturdy and relatively simple construction that may be easily positioned between the longitudinal frame members of truck chassis irrespective of the distance between such longitudinal chassis members.

Another object of the present invention is to provide a linkage mechanism for dump hoists that is adjustable so that the hoist will tend to hold the dump bed in fixed relative position notwithstanding structural differences in the various types of truck beds and chassis.

A further object of this invention has been to provide a dump hoist that may be installed in a relatively small clearance space on different types of vehicles.

Another object of this invention is to provide special mounting attachments for a hydraulically operated dump hoist that are adjustable to readily adapt the dump hoist for use on different types of truck and wagon installations.

A still further object is to provide adjustable supports and connective link mechanisms for use with dump hoists.

Further objects and advantages of the present invention will be apparent from the appended description and drawings in which:

Fig. 1 is an end elevation in partial section showing the dump hoist of this invention in assembled position;

Fig. 2 is a side elevation in partial section of the dump body in raised position, showing further features of this invention;

Fig. 3 is an elevation in enlarged detail showing the adjustable supports used for the present dump hoist;

Fig. 4 is a top plan view of the installation shown in Fig. 3;

Fig. 5 is a detail showing features of an expansive link used in this invention;

Fig. 6 is a partial elevation in enlarged detail showing a feature of this invention; and Fig. 7 is a perspective view showing the structure of a dump hoist cylinder supporting hanger.

Briefly stated the present invention provides a dump hoist mechanism which may be readily installed on conventional types of trucks and wagons for use as desired. The frame support members for the dump hoist are adjustable so that the hoist may be installed between the longitudinal frame members of various sizes of trucks. Further additional linkage mechanisms are provided, the length of which is likewise adjustable so that operation of the hoist will not damage or overload structural members of the truck or body. The primary advantages of the present invention are inherent in its adaptability for use in installations of varying size and in the compact nature of the structural arrangement itself which requires a minimum of clearance for successful operation of the hoist.

While it is contemplated that more than one hoist unit may be used for each installation all of the units to be used on a particular installation are preferably of the same size and design. Accordingly a description of a single unit should be adequate to fully describe the full installation.

In Fig. 1 a hoist unit 11 is shown as applied for use on a truck having a side dump bed 12. The unit 11 is mounted so that its longitudinal axis and the axis of the operative hoist cylinder 13 is arranged transversely to the longitudinal axis of the truck. In order to properly support the hoist unit in this position parallel channel members 14 of the hoist unit 11 are provided on one end with an angle extension 16 which is adapted for engagement with the upper surface 17 of longitudinal frame members 18 of the truck chassis. While not shown the frame members 18 and chassis are supported above the drive axle 19 and wheels 21 by springs and support members of conventional design.

In order that the hoist unit may be positioned and supported between the corresponding frame members 18 of different trucks in which the members 18 are closer or further apart, telescoping members 22 are provided for reciprocal movement along the channel members 14. At their outer ends these telescoping members 22 are welded or otherwise secured to an angle member 23 similar to the angle extension 16. Elongated slots 24 are provided in the face of the telescoping members 22, and bolts 26 are passed through openings in the channels 14 and through the slots 24 so that the telescoping members may be secured in adjusted position with respect to the channel members 14.

Straps 27 are welded or otherwise secured to the inner surface of the channel members 14 to provide downwardly depending flanges 28 having circular openings 29 therein. These openings 29 provide bearing support for the hanger pivots 31 which are disposed outwardly from substantially U-shaped hanger 32. This U-shaped hanger 32 is adapted to pass around the bottom end of hydraulic hoist cylinder 13 to more securely hold the cylinder 13 in its swinging support. A circular banding strap 32 is secured to the upper ends of the hanger 32 to completely encircle the cylinder 13. However, the strap 33 is split to receive a tightening bolt 34 so that the cylinder 13 may be removed if desired.

When properly positioned between the chassis members 18, the support members 14 and hanger 32 will hold the hydraulic cylinder 13 in a position from which a considerable hoisting force may be exerted against the truck bed 12. As shown in Figs. 1 and 2, the piston 36 of the hydraulic cylinder 13 is connected by means of a pin 37 to supporting frame members 38 secured to the bottom of the dump bed 12. Actually the piston 36 is provided with a cross head 39 through which the pin 37 extends for connection to the frame members 38. The hydraulic cylinder itself is provided with a conventional cap 41 and fluid seals 42 adjacent its upper end while the lower end which is received in the hanger 32 is interconnected by means of a hose 43 with a hydraulic pump (not shown). Where more than one cylinder 13 is used on a single installation, the separate hoses 43 are interconnected with a single source of fluid supply so that the hoisting pressures exerted by each of the separate cylinders will be equal.

In order to prevent damage to the hinge members 44 which pivotally secure the dump bed 12 to the truck chassis the present inventors provide an adjustable linkage mechanism 46 adapted to relieve the strain of the initial bed raising forces from the hinge members 44. The essential parts of this linkage mechanism 46 are a telescoping section or turnbuckle 47 and connector links 48. The turnbuckle 47 as shown in Fig. 5 is made up of a tubular member 49 threaded internally to receive the threads 51 of telescoping rod 52. Both the tubular portion 49 and rod 52 are provided with bearing members 53. In order to lock the rod 52 in adjusted position with respect to the tubular portion 49, a lock nut 54 is threaded on the rod 52 so that it may be moved into secure engagement with a corresponding nut 56 secured to the open end of the tubular member 49. When the nut 54 is moved into locking engagement with the nut 56 the bearing members 53 should be aligned so that a hinge pin 57 may be passed through one end of the turnbuckle 47 to secure this first end to brackets 58 mounted on the underneath side of the bed 12. A separate pin 59 is likewise inserted through the ends of the links 48 and through the other bearing 53 so that the turnbuckle 47 and links 48 are in pivoted engagement. The opposite ends of the links 48 are secured to a hollow pipe section 61 pivotally mounted on pin 62 disposed to interconnect the opposite channel members 14.

When properly installed the length of the turnbuckle 47 may be adjusted so that the inwardly disposed end 53 of the turnbuckle 47 will be in contact with a strap member or stop 63 positioned across the top of and interconnecting the opposed channel members 14. When the linkage mechanism is in this engaged position thrust exerted by the piston 36 when the bed is in its down position will tend to react through the turnbuckle 47 against the strap 63 rather than acting directly on the hinges 44.

When it is desired to raise the bed 12, the hydraulic pressure in the cylinder 13 is increased until the thrust force exerted by the piston 36 is sufficient so that an upward component thereof will be great enough to start to raise the bed 12 off of the truck chassis. As the bed 12 raises further toward a dumping position the linkage mechanism 46 inclusive of the turnbuckle 47 will move out of engagement with the strap 63. Further continued energization of the hydraulic pump will cause additional relative elongation of the piston 36 to elevate the dump bed 12 to its full dumping position as shown by the dotted line representation in Fig. 1. The alternate position for the linkage mechanism 46 is likewise shown in this figure.

It will be observed that since the length of the cylinder support members is adjustable and since the length of the turnbuckle 47 is likewise adjustable, the equipment described is readily adaptable for use on trucks of different size and capacity. Further since units of only one size are necessary the advantages coincident with mass production are possible. Accordingly it will be observed that the mechanisms of the foregoing invention readily satisfy the objectives set forth in an efficient and economical manner.

The purpose of the adjustable linkage mechanism 46 and of the stop member 63 is to relieve the hinge 44 of the excessive pressures coincident with the use of the cylinder 13 and is positioned at a relatively small angle with respect to the truck bed 12 and hinge alinement. With the arrangement as shown, the upwardly directed component of force is approximately one-third of the total force exerted by the cylinder when the truck bed is in its lowered position. In the instant structure, an adjustable link is used which will be in engagement with a fixed member, such as stop 63, during the initial hoisting sequence. There is no noticeable shock loading on the hinge when the adjustable link comes out of contact with the stop member, since with the relative position of the hinge the adjustable link pivot and the cylinder as shown, the truck bed will be elevated approximately fifteen or twenty degrees before the link-carried bearing member 53 and stop member 63 come out of engagement. With fifteen or twenty degrees elevation the force component tending to rotate the truck bed 12 about its hinge 44 is approximately two-thirds of the total force applied to the cylinder instead of the initial one-third noted at the start of the hoisting operation. With this substantial increase in the force tending to elevate the bed and a corresponding reduction in the thrust loading on the hinge, the hoisting operation may be continued without fear of damage to the hinge.

A further feature of the instant invention is the relative positioning of the hinge, the adjustable link pivot and the pivotal mounting for the hoist cylinder. As the truck bed is raised with this arrangement, the adjustable link will actually be moved away from the stop member 63 as the forces exerted between the adjustable link and stop member as decreased by increased elevation of the truck bed.

While the beneficial features of the present invention have been shown and described in conjunction with a single embodiment of the invention, it will be apparent that the present invention is subject to various modifications and changes. All such modifications as are within the scope of the hereunto appended claims are deemed to be a part of this invention.

What is claimed is:

1. A hoist unit for use on vehicles having pivotally mounted dump beds comprising a hydraulic cylinder pivotally mounted on the frame of said vehicle at approximately the center line of said body and interconnected with the dump bed at a position beyond the pivotal cylinder mounting and away from said hinge, a bracket mounted on said dump bed adjacent said hinge, a stop member secured to said frame, and an adjustable link attached to said bracket for engagement with said stop when the dump bed is in its lowered position so that initial thrust forces exerted by said hydraulic cylinder will act against the said stop on the frame thereby preventing binding and damage of said hinge.

2. A hoist unit for use on vehicles having pivotally mounted dump beds comprising a hydraulic cylinder pivotally mounted on the frame of said vehicle, a piston for reciprocal movement within said cylinder having its outer extremity connected with the dump bed at a position removed from the hinged pivot securing the dump bed to the vehicle frame, a bracket mounted on said dump bed adjacent to the hinge, a stop member secured to said frame intermediate said hinge and the pivotal mounting of said cylinder, and an adjustable pivotal link attached to said bracket out of alinement with said hinge and the pivotal mounting on said cylinder for engagement with said stop when the dump bed is in its lowered position so that initial thrust forces exerted by said hydraulic cylinder will act against a stop on said frame thereby preventing binding and damage of said hinge.

3. A hoist unit for use on vehicles having pivotally mounted dump beds comprising a hydraulic cylinder mounted on the frame of said vehicle, a piston for reciprocal movement within said cylinder having its outer extremity connected with the dump bed at a position removed from the hinged pivot securing the dump bed to the vehicle frame, a bracket mounted on said dump bed adjacent to the hinge, a stop member secured to said frame, a strap member pivotally secured to the cylinder supporting frame members intermediate said hinge and the cylinder mounting, and an adjustable link having one end attached to said bracket and the opposite end attached to said stop member, said adjustable linke and strap being positioned so that the movable end of said adjustable link will be in engagement with said stop when the dump bed is in its lowered position so that initial thrust forces exerted by said hoisting unit will act against said stop thereby preventing binding and damage of said hinge.

DALE M. VAN PELT.
LEIGHTON W. SANNER.
JULIAN WILSON.

References Cited in the file of this patent

UNITED STATES PATENTS

| Number | Name | Date |
|---|---|---|
| 1,482,510 | Edwards | Feb. 5, 1924 |
| 1,963,287 | Ballert | June 19, 1934 |
| 2,220,815 | Feilcke | Nov. 5, 1940 |

FOREIGN PATENTS

| Number | Country | Date |
|---|---|---|
| 251,625 | Italy | Jan. 24, 1927 |
| 715,093 | France | Apr. 11, 1931 |